United States Patent [19]

Dimmock et al.

[11] 3,748,593

[45] July 24, 1973

[54] METHOD AND MEANS OF CONSTRUCTION OF A SEMICONDUCTOR MATERIAL FOR USE AS A LASER

[75] Inventors: John O. Dimmock, Concord; Ivars Melngailis, Wellesley; Alan J. Strauss, Lexington, all of Mass.

[73] Assignee: Massachusetts Institute of Technology, Cambridge, Mass.

[22] Filed: Nov. 17, 1970

[21] Appl. No.: 90,469

Related U.S. Application Data

[63] Continuation of Ser. No. 635,766, May 3, 1967, abandoned.

[52] U.S. Cl. ............ 331/94.5 H, 250/83, 252/62.3, 252/301.4, 317/234 R

[51] Int. Cl. ............ H01r 3/00

[58] Field of Search ............ 331/94.5; 317/235

[56] References Cited

UNITED STATES PATENTS

| | | | |
|---|---|---|---|
| 3,265,977 | 8/1966 | Wolff | 330/4.3 |
| 3,302,051 | 1/1967 | Salginaitis | 313/108 |
| 3,364,014 | 1/1968 | Fredrick | 252/62.3 T X |
| 3,403,133 | 9/1968 | Fredrick et al. | 252/62.3 T |
| 3,413,507 | 11/1968 | Kohjj Stoh et al. | 313/108 |
| 3,439,169 | 4/1969 | Lynch | 250/199 |
| 3,568,087 | 3/1971 | Phelan et al. | 331/94.5 |

FOREIGN PATENTS OR APPLICATIONS

| | | | |
|---|---|---|---|
| 1,116,514 | 6/1968 | Great Britain | 331/94.5 |

OTHER PUBLICATIONS

Butler et al.: "Diode Lasers of Pb1-ySnySe and Pb1-xSnx Te," Applied Physics Letters, Vol. 9, pp. 427-9, Dec. 15, 1966

Lax: "Scanatron-A Scanning Beam Semiconductor Laser," Solid State Design, Vol. 6, pp. 19-23, March, 1965

*Primary Examiner*—Edward S. Bauer
*Attorney*—Arthur A. Smith, Jr., Robert Shaw, Edward D. Thomas, Martin M. Santa, Thomas Cooch and Robert I. Dunn

[57] ABSTRACT

A semiconductor material for use as a lasing medium made of a solid solution of at least two Group IV- VI compounds which form a semiconductor alloy having a direct band gap which is increased or decreased, depending on the proportion of said materials in the solid solution, there being a certain proportion at which the band gap is zero, at a given temperature and pressure, whereas greater or lesser proportions than said certain proportion results in an increase in the band gap of the semiconductor from said zero band gap.

11 Claims, 6 Drawing Figures

INVENTORS
IVARS MELNGAILIS
JOHN O. DIMMOCK
ALAN J. STRAUSS
BY, Robert T. Dunn
ATTORNEY

METHOD AND MEANS OF CONSTRUCTION OF A SEMICONDUCTOR MATERIAL FOR USE AS A LASER

This is a continuation of abandoned application Ser. No. 635,766 filed May 3, 1967.

This invention relates to semiconductor materials and more particularly to methods and means for making a direct band gap semiconductor material in which lasing action is induced when the material is located in an optical cavity and energy of sufficient intensity is directed to the material.

Heretofore, semiconductor materials of various kinds have been employed to form lasers. The material is disposed between optically parallel reflective surfaces, which define an optical cavity, and energy is directed to the material, producing an inverted population of elevated energy states within the material. Transisitons to lower enegy states are accompanied by emission of radiation, which is amplified within the material by the process of stimulated emission, producing an intense beam of coherent radiation which emanates from one or both of the reflective surfaces. The wave length of the coherent radiation is determined by the optical cavity length, the band gap of the semiconductor material, the nature and intensity of the energy directed to the material and the radiation absorption and emission properties of the material.

It is one object of the present invention to provide methods and means of construction of a semiconductor material in which the band gap can be precisely established when the semiconductor is formed.

It is another object of the present invention to provide methods and means of construction of a semiconductor material having a band gap which is tailored to any desired value within a relatively wide range varying at its extremes in the ratio 2 to 1 or greater.

It is another object of the present invention to provide methods and means of construction of a semiconductor material having a band gap which can be tailored when the semiconductor material is formed by preselecting the relative amounts of constituents therein so that the band gap thereof can be made any value between a relatively large value and zero.

It is another object of the present invention to provide methods and means of construction of a semiconductor material having a band gap less than 0.10 eV.

It is another object of the present invention to provide methods and means of construction of a semiconductor material which can be energized to produce radiation over a wide range of radiation wavelengths, depending upon the relative amounts of constituents forming the semiconductor material.

It is another object of the present invention to provide methods and means of construction of a semiconductor laser for producing coherent radiation at substantially any frequency within a wide range of frequencies, depending upon the relative amounts of constitutents forming the semiconductor material.

Other features and objects of the present invention will be apparent from the following specific description taken in conjunction with the FIGS. in which.

Figure 4:
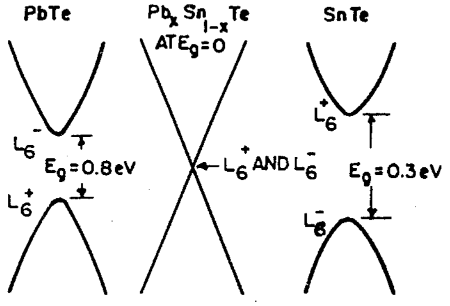
Figure 5:
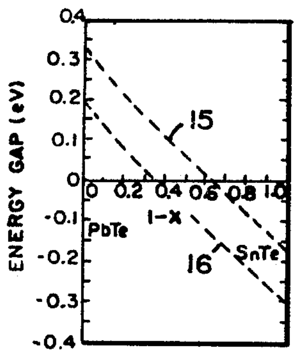
Figure 6:
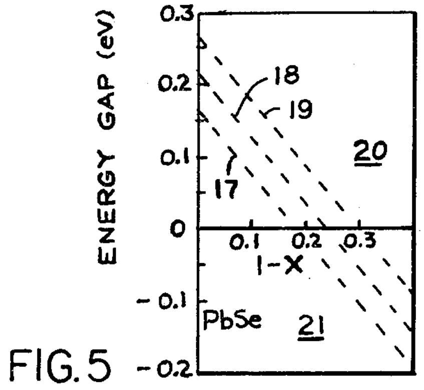

FIG. 4 includes band diagrams showing valence and conduction band levels (the energy-momentum curves representing the conduction and valence band levels in the semiconductor material) for semiconductors formed of three different ratios of constituents and illustrates a fundamental concept of the invention;

FIG. 5 is a plot of energy gap versus the relative amounts of the constituents PbTe and SnTe in a variety of PbSnTe type alloy semiconductors, showing the relationship therebetween and how precise tailoring of the energy gap can be accomplished by selection of the relative amounts of the constituents; and FIG. 6 is a similar plot for the alloy type PbSnSe.

Figure 1:
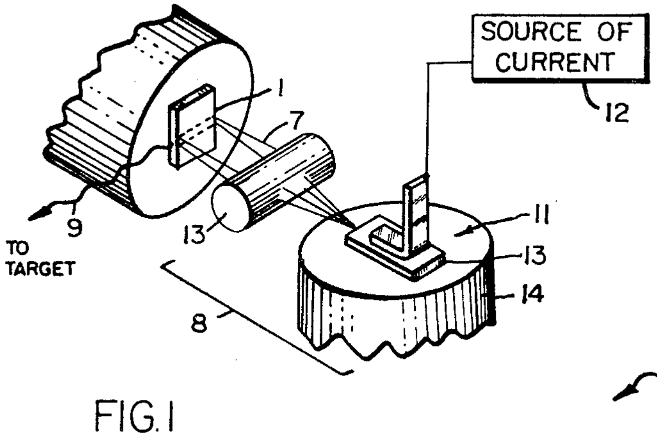
FIG. 1 is an isometric view of an optically pumped semiconductor alloy laser incorporating features of the present invention.
Figure 2:
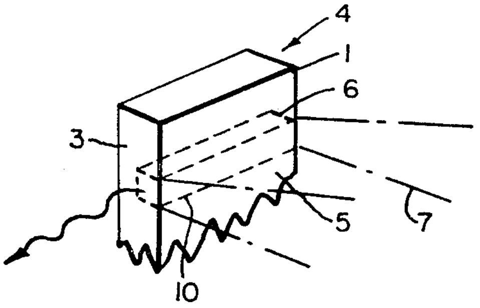
FIG. 2 is an enlarged view of the semiconductor alloy laser body.

FIG. 1 shows a suitable structure for optically pumping a direct-gap type semiconductor laser constructed in accordance with the present invention. The laser includes a chip 1 of, for example, PbSnTe alloy. More particularly, the alloy is expressed as $Pb_xSn_{1-x}Te$, in which $x = 0.81$. The chip is obtained from a vapor grown n-type crystal in which $n = 1.7 \times 10^{17}$ cm$^{-3}$ at 77° K. It is grown in the shape of a parallelepiped which is 550 microns long in the direction of laser emission. The chip 1 is mounted on a cold finger 2 of copper which is in contact with liquid helium so that the temperature of the chip is maintained below 77° K. Two 100 faces 3 and 4 of the chip of PbSnTe alloy are cleaved perpendicularly to the 100 face 5 to form a Fabry-Perot cavity 6 between the two parallel faces 3 and 4. These parallel faces are perpendicular to the face 5 which is irradiated by intense pumping radiation 7 from the optical pumping system 8. This pumping radiation is of sufficient intensity and at suitable wavelength to produce lasing action within the chip of PbSnTe alloy. Thus, coherent radiation denoted by arrow 9 issuing from the chip is in the direction of the optical cavity 6 defined between the faces 3 and 4 thereof. Emission is any other direction not parallel to the cavity is inhibited by roughening other surfaces of the chip and by having one face of the chip in the shadow of the optical pumping system 8.

The pumping radiation 7 from the system 8 is preferably of very narrow band and very intense, and is directed to the narrow strip 10 on the surface 5 of the chip 1 along the Fabry-Perot cavity. If the pumping radiation is of sufficient intensity, there will be produced in the chip 1 in the immediate vicinity of the narrow strip 10 an inverted population of enery states of electrons, and so lasing action will occur and the radiation 9 emanating from the chip will be highly directional, monochromatic and coherent. These conditions define laser radiation. At lower pumping energy intensities, below the lasing threshold, the radiation generated within the chip will be substantially non-directional and non-coherent and of much lower peak intensity. One suitable system for generating pumping radiation 7 of sufficient intensity to produce lasing action within the chip is to employ another laser for generating the pumping radiation. This may include, for example, a diode semiconductor laser 11 energized by electrical energy such as electrical pulses from a source 12. The diode laser 11 may be, for example, a GaAs diode 13 mounted on a heat sink 14, in contact with liquid helium, so that the temperature of the diode is maintained below 77° K. The diode is oriented on the heat sink so that the beam of pumping radiation 7 issues therefrom substantially all in one direction and is directed by cylindrical lens 13 to the chip 1 of PbSnTe alloy.

Figure 3:
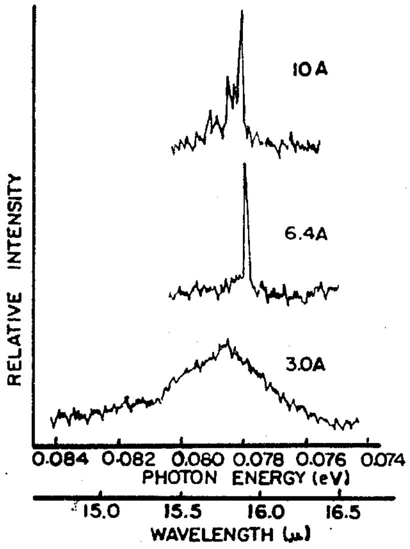
FIG. 3 illustrates the spectrum of radiation emitted from the optically pumped semiconductor laser when energized below and above lasing threshold.

In operation, current pulses of a few microseconds duration are applied from the source 12 to the GaAs diode 13 at the rate of about 3,000/secs. FIG. 3 illustrates the spectrum of radiation 9, for example, emitted from a PbSnTe alloy chip 1 as the result of the incident pumping radiation from the GaAs diode. More particularly, the chip which provides this spectrum of radiation has the formula $Pb_xSn_{1-x}Te$, where $x$ is the mole fraction of the alloy which is Pb and $1-x$ is the mole fraction which is Sn. For example, in operation, when the diode current is about 3.0 amperes, the spectrum of radiation from the chip 1 of this formula is as represented by spectrum denoted 3.0 amperes in FIG. 3. As the diode current is increased, the onset of coherent emission and lasing action in this chip of PbSnTe alloy is evidenced by an abrupt increase in the emission intensity, as well as by the appearance of mode structure in the spectrum of the emitted radiation. This occurs when the GaAs diode current is about 3.7 amperes, which corresponds to pumping radiation 7 of approximately 1.5 watts of 0.84 micron radiation. A single cavity mode at 15.9 microns is excited in the chip 1 at currents between 3.7 and 8 amperes and multimode operation is observed at higher currents. This single mode is illustrated in the spectrum denoted 6.5 amperes in FIG. 3 and the multimodes are shown in the spectrum denoted 10 amperes in FIG. 3.

As can be seen from the three spectra obtained at different pumping energy levels and shown in FIG. 3, the energy gap for the $Pb_xSn_{1-x}Te$ ($x = 0.81$) semiconductor alloy at about 12° K is 0.078 eV. This can be compared with the energy gap of PbTe at this temperature, which is 0.186 eV. Thus, there is a decrease in the energy gap of PbTe with an increase in the Sn concentration in the alloy. Similarly, the energy gap of SnTe at about 4.2° K is approximately 0.3 eV, which is larger than the energy gap of either the PbTe or the PbSnTe alloy. Thus, the alloying of PbTe and SnTe produces a semiconductor material of lower band gap than either the PbTe or the SnTe under equivalent conditions.

It is observed that the band gap of PbTe increases as temperature increases and that the band gap of SnTe decreases as temperature increases. This phenomenon coupled with the observed energy gap of the $Pb_xSn_{1-x}Te$ alloy semiconductor, shown in the spectra of FIG. 3, leads to a suggested band structure model for the $Pb_xSn_{1-x}Te$ alloy, in which the valence and conduction bands of SnTe are inverted from those of PbTe. This is illustrated by the three energy momentum diagrams shown in FIG. 4. In the first diagram denoted PbTe, the valence and conduction band edges occur at the L-point in the Brillouin zone. This valence band edge is assumed to be an $L_6+$ state and the conduction band edge is an $L_6-$ state. In accordance with the proposed model, with increasing Sn composition, the energy gap initially decreases as the $L_6+$ and $L_6-$ states approach each other and goes to zero at some intermediate composition where the two states become degenerate and then increases with the $L_6+$ state now forming the conduction band edge and the $L_6-$ state forming the valence band edge. This degenerate condition is illustrated by the structure in FIG. 4 denoted $Pb_xSn_{1-x}Te$. The inverted state is represented by the structure denoted SnTe in FIG. 4.

The $L_6+$, $L_6-$ states have only a two-fold spin degeneracy and so their crossover does not result in a semimetal, but in a semiconductor with the valence and conduction bands interchanged.

FIG. 5 is a plot of energy gap (electron volts) versus the factor $1-x$ in the alloy $Pb_xSn_{1-x}Te$. The two curves plotted are at different temperatures. Curve 15 is at 300° K and curve 16 is at a temperature of 12° K or lower. Energies for SnTe are plotted as negative values to conform with the proposed inverted band model discussed above with reference to FIG. 4. The curves indicate that at 12° K the energy gap passes through zero at $1-x \approx 0.35$, whereas at 300° K this occurs at $1-x \approx 0.62$.

The change in energy gap with composition for the $Pb_xSn_{1-x}Te$ alloy can be understood qualitatively in terms of the difference between the relativistic effects in Pb and Sn. For example, about 36 percent of the valence band $L_6+$ state come from a Pb s-state and 31 percent of the conduction band $L_6-$ state come from a Pb p-state. The difference between the relativistic shifts of the valence states of Pb and Sn is 2.75 eV for the s-states and 0.73 eV for the p-states. From this, the upward shift of the $L_6+$ state is estimated at about 0.99 eV and the downward shift of the $L_6-$ state is estimated at 0.23 eV, in going from PbTe to SnTe. Thus, the relative shift of about 0.76 eV indicates that the bands should cross at some intermediate value of compression and at this crossing point the band gap is substantially zero.

Similar relativistic effects exist in other combinations of direct-gap type semiconductor materials which form alloys having a rock-salt type of crystalline structure. Generally this includes alloys of two semiconductor materials, each of which is a compound of an element selected from Group IV and a element selected from Group VI of the Periodic Table. This includes, for example, $Pb_xSn_{1-x}Se$, $Pb_xSn_{1-x}S$ and $Pb_xGe_{1-x}Te$.

FIG. 6 is a plot of energy gap versus the mole fraction $1-x$ of SnSe in the $Pb_xSn_{1-x}Se$ alloys. Three curves are plotted at different temperatures; curve 17 is at 77° K, curve 18 is at 195° K and curve 19 is at 300° K. The energy gaps for the curves 17 to 19 pass through zero at $1-x$ equal to about 0.19, 0.24, 0.30 respectively.

The semiconductor alloys $Pb_xSn_{1-x}Se$ for the range of $1-x$ from zero to 0.43 have rocksalt structure and form a complete series of pseudo-binary solid solutions over this range. The plots 17 to 19 in FIG. 6 cover only this range. The energy gap is determined by employing a spectrophotometer to measure optical transmission through an evaporated film of the alloy. The composition is determined by electron microprobe analysis. When making the transmission measurements above the zero energy gap line (region 20), where energy gap decreases as $1-x$ increases, the energy gap becomes so small as $1-x$ increases that the absorption edge shifts beyond the limit of the spectrophotometer. Further increases in $1-x$ below the zero energy gap line (region 21), where energy gap increases as $1-x$ increases, results in an absorption edge again within the limit of the spectrophotometer. In region 21, the energy gap is assigned negative values.

Negative values are assigned to the energy gap in region 21 to signify that the conduction and valence bands of the alloy are inverted as described above with reference to the model illustrated in FIG. 4. Further evidence of this inversion of conduction and valence bands is that in region 20, the magnitude of energy gap increases with temperature and in region 21 the magnitude of energy gap decreases with an increase in temperature; other factors being the same.

Single crystal epitaxial films of the semiconductor alloys may be formed by an evaporation technique. Ingots of the alloy are first prepared in the selected proportional composition by sealing appropriate quantities of each of the constituent elements in an evacuated quartz ampoule, melting at a suitable temperature and then quenching. The quartz ampoules are then opened and placed in a furnace below another furnace containing chips of substrate material. Thereafter, vacuum evaporation of the ingots occurs with the substrate furnace cooler than the ingot furnace. Deposition continues for a prescribed period of time after which the deposited films are allowed to cool in vacuum. The mole fractions of each compound in the ingot may differ from the mole fraction in the epitaxial film. However, the difference is usually slight and may be ascertained empirically. In this manner, epitaxial layers of $Pb_xSn_{1-x}Te$, $Pb_xSn_{1-x}Se$ and $Pb_xGe_{1-x}Te$ and other semiconductor alloys selected as described herein can be formed.

Bulk crystals of the semiconductor alloy can also be grown from a liquid solution of the constituents in selected proportions.

This completes description of a number of embodiments of the present invention of method and means of construction of a semiconductor material consisting of an alloy of selected materials, selected so that over some range of composition, the solid solution is a semiconductor alloy having a direct band gap and so that within this composition range, as the relative amount of one of the materials increases, the band gap of the alloy decreases to zero, and with further increase in the relative amount of the same one material, the band gap increases from zero to higher values. Thus, by varying the relative amounts of the constituents, the band gap of the alloy can be tailored to selected desired values so that the semiconductor material can be used as, for example, the lasing medium in a laser or a radiation detector to produce or respond to radiation of a given wavelength. These embodiments are described by way of examples of the invention and are not intended to limit the spirit and scope of the invention, as set forth in the accompanying claims.

What is claimed is:

1. In a laser, a semiconductor within the optical cavity of the laser to which energy is directed to produce an inverted population of energy states within the material followed by lasering action within the material, consisting essentially of:

a solid solution of at least two semiconductor materials each of which is composed of a different element selected from Group IV and the same element selected from Group VI of the Periodic Table in proportions so selected to provide a predetermined band gap for the solid solution of semiconductor material, said predetermined band gap being less than the band gap of either of the two semiconductor materials under equivalent conditions.

2. In a laser system as in claim 1, wherein the predetermined band gap is greater than zero and less than 0.1 eV.

3. In a laser system as in claim 1, wherein the compounds are each direct gap type semiconductor materials.

4. In a laser system as in claim 3, wherein one of the compounds has a first energy state at the conduction band edge thereof and a second energy state at the valence band edge thereof, and the other compound has said first energy state at the valence band edge thereof and said second energy state at the conduction band edge thereof.

5. In a laser system as in claim 4, wherein said first energy state is the $L_6^+$ state and said second energy state is the $L_6^-$ state.

6. In a laser system as in claim 1, wherein one of the Group IV elements is lead and the other is tin.

7. In a laser system as in claim 6, wherein the lead compound is PbTe and the tin compound is SnTe.

8. In a laser system as in claim 7. wherein the material has the formula $Pb_xSn_{1-x}Te$ and $x$ is greater than 0.30.

9. In a laser system as in claim 6, wherein the lead compound is PbSe and the tin compound is SnSe.

10. In a laser system as in claim 9, wherein the material has the formula $Pb_xSn_{1-x}Se$ and x is greater than 0.65.

11. In a laser system as in claim 6, wherein the number of mols of Pb in said solid solution is greater than the number of mols of Sn in the solid solution.

* * * * *

UNITED STATES PATENT OFFICE
CERTIFICATE OF CORRECTION

Patent No. 3,748,593 Dated July 24, 1973

Inventor(s) John O. Dimmock, Ivars Melngailis and Alan J. Strauss

It is certified that error appears in the above-identified patent and that said Letters Patent are hereby corrected as shown below:

Insert as the first paragraph in column 1:

--The invention herein described was made in the course of work performed under a contract with the Electronic Systems Division, Air Force Systems Command, United States Air Force.--

Signed and sealed this 27th day of August 1974.

(SEAL)
Attest:

McCOY M. GIBSON, JR.
Attesting Officer

C. MARSHALL DANN
Commissioner of Patents